United States Patent [19]

Engelberger et al.

[11] 4,132,937

[45] Jan. 2, 1979

[54] PROGRAMMABLE MANIPULATOR WITH DYNAMIC FEEDBACK APPARATUS FOR STABILIZATION

[75] Inventors: Joseph F. Engelberger; Maurice J. Dunne, both of Newtown; Peter F. Rogers, Bethel, all of Conn.

[73] Assignee: Unimation, Inc., Danbury, Conn.

[21] Appl. No.: 732,977

[22] Filed: Oct. 18, 1976

[51] Int. Cl.² .................................................. G05B 11/18
[52] U.S. Cl. ...................................... 318/568; 318/616
[58] Field of Search ............... 318/568, 616, 615, 617, 318/618

[56] References Cited

U.S. PATENT DOCUMENTS

| | | | |
|---|---|---|---|
| 3,512,060 | 5/1970 | Floyd | 318/616 X |
| 3,648,143 | 3/1972 | Harper | 318/568 |
| 3,727,119 | 4/1973 | Stanley et al. | 318/568 |
| 3,777,122 | 12/1973 | Borsboom | 318/615 X |
| 3,906,326 | 9/1975 | Chur | 318/616 X |
| 3,934,186 | 1/1976 | Hayakawa et al. | 318/568 X |

*Primary Examiner*—B. Dobeck

*Attorney, Agent, or Firm*—Mason, Kolehmainen, Rathburn & Wyss

[57] ABSTRACT

A programmable manipulator apparatus having an arm movable in a plurality of axes employs a feedback signal representing the dynamic behavior of the end of the manipulator arm for use in stabilizing a positional servo loop especially where the position sensing is performed at a location on the manipulator apparatus which is physically closer to the drive apparatus than the end of the arm. The manipulator apparatus includes encoders for developing position signals representing the position of the manipulator in each of the axes which are stored in a memory. The stored digital signals are utilized as command signals and are compared with the encoder signals to develop an error signal utilized to control movement of the manipulator apparatus. The dynamic feedback signal is selectively combined with the positional error signal in a predetermined manner to stabilize the control and operation of the manipulator arm by providing a high negative dynamic feedback signal during deceleration and a low signal during the acceleration phase thereby avoiding conflict between the positional error signal and the dynamic feedback signals.

26 Claims, 4 Drawing Figures

PROGRAMMABLE MANIPULATOR WITH DYNAMIC FEEDBACK APPARATUS FOR STABILIZATION

BACKGROUND OF THE INVENTION

A. Field of the Invention

The present invention relates to manipulator apparatus and more particularly to manipulator apparatus which may be controlled by the sensing of the position of the manipulator arm and by the sensing of the dynamics of the end of the manipulator arm.

B. Description of the Prior Art

Various types of manipulator apparatus are controlled by the comparison of command signals which are stored in memory and readout in a replay mode with position signals developed by encoders representing the position of the manipulator arm in each of various controlled axes.

Such programmable manipulators are shown, for example, in Devol U.S. Pat. No. 3,306,471 dated Feb. 28, 1967; Devol U.S. Pat. No. 3,543,947 dated Dec. 1, 1970; Dunne, et al U.S. Pat. No. 3,661,051 dated May 9, 1972; Engelberger, et al U.S. Pat. No. 3,744,032 dated July 3, 1973; Engelberger, et al U.S. Pat. No. 3,885,295 dated May 27, 1975; Devol, et al U.S. Pat. No. 3,890,552 dated June 17, 1975; and British Pat. No. 781,465. While these arrangements have, in general, been satisfactory for their intended purpose, they are not entirely suitable for applications involving manipulator arms having combinations of high tip velocities, long arm extensions as measured from the center of the drive train of the apparatus, and appreciable arm and load masses.

In these applications as well as many related applications, the control of the arm is complicated by the fact that the position sensing occurs at a location which is remote from the actual end of the manipulator arm and the signal developed by the position encoder may not correspond to the actual position of the end of the manipulator arm. With these arrangements the dynamics of the arm greatly influence the actual position of the arm relative to the sensed and commanded position as a result of the indirect position sensing.

This results in instantaneous control problems such as the whipping of the arm, overshoot, increased settling time or perturbation effects. In addition to the control of manipulator apparatus, these problems also occur in other applications of indirect position sensing as in the control of an automatic crane moving large masses and having a long projecting arm and also where manipulator arms extend into furnaces. Further, complications in controlling manipulator apparatus and related apparatus occur when the various controlled axes are interconnected so that the dynamics of the various axes can not be measured separately for each axis.

SUMMARY OF THE INVENTION

It is therefore, a primary object of the present invention to provide a new and improved manipulator apparatus which avoids one or more of the above-described disadvantages of the prior art arrangements.

It is another object of the present invention to provide a new and improved manipulator apparatus that senses the dynamics of the manipulator arm and utilizes the dynamic data to control movement of the arm to the final commanded position.

It is a further object of the present invention to provide a new and improved manipulator apparatus wherein control of the apparatus is accomplished by a positional servo loop and a dynamic feedback signal is employed to reduce overshoot and improve the dynamic response of the manipulator apparatus.

It is yet another object of the present invention to provide a new and improved manipulator apparatus wherein an accelerometer is provided for at least one of the controlled axes that generates an electrical signal representing the acceleration in the particular axis which is utilized to selectively apply a negative feedback control signal to the drive train of the manipulator apparatus; the magnitude of the negative feedback signal increases in a predetermined manner as the end of the manipulator arm approaches the desired position.

It is still another object of the present invention to provide a new and improved manipulator apparatus wherein the velocity of an axis of the manipulator apparatus is sensed relative to an interconnected axis, an electrical signal representation of this relative velocity is differentiated to obtain an acceleration feedback signal, and the acceleration feedback signal is combined with an error signal in an indirect sensing positional loop to control dynamic operation of the apparatus.

Briefly, in accordance with one aspect of the invention, a programmable manipulator apparatus is provided which is movable in a plurality of axes in accordance with command signals which are stored in memory. The command signals represent the position of the manipulator arm and are compared with position signals developed by encoders which represent the position of the various axes of the arm. An error signal is developed from the comparison of the command signals and encoder signals to control the drive train actuators for the various axes. The position representations are measured for certain of the axes at locations closer to the drive system than the end of the arm. Apparatus is provided for the axes which utilize such indirect position sensing to sense the actual dynamic behavior of these axes. The dynamic behavior sensing apparatus generates an electrical signal which is utilized to provide a dynamic feedback signal. The dynamic feedback signal is selectively combined with the positional error signal to control the manipulator apparatus by applying a high negative dynamic feedback signal during deceleration.

The invention, both as to its organization and method of operation together with further objects and advantages thereof, will best be understood by reference to the following specification taken in connection with the accompanying drawings.

BRIEF DESCRIPTION OF THE DRAWINGS

For a better understanding of the invention frequent reference will be made to the drawings wherein.

DETAILED DESCRIPTION OF THE PREFERRED EMBODIMENT

Figure 1:
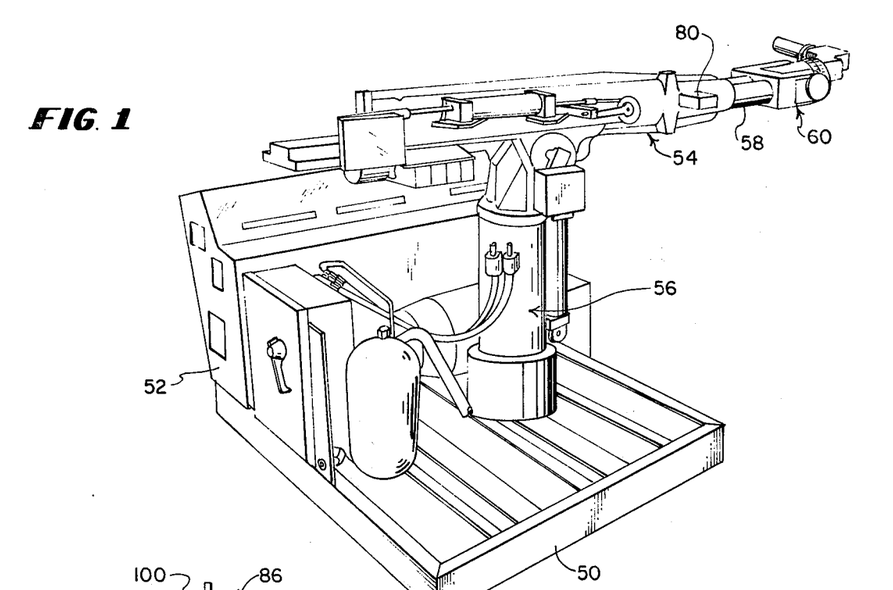
FIG. 1 is a perspective view of a programmable manipulator apparatus utilized in conjunction with the dynamic feedback apparatus of the present invention.

Referring now to FIGS. 1 through 4 and more particularly to FIG. 1, the programmable manipulator apparatus of the present invention is therein illustrated as comprising a generally rectangular base or platform 50 on which the manipulator arm is supported together with the hydraulic, electrical and electronic components necessary to provide the programmed articulations in the six degrees of freedom or axes of the manipulator arm.

Specifically, the base 50 supports a control cabinet indicated generally at 52 within which is housed the electronic control system of the manipulator apparatus. The hydraulically powered manipulator arm comprises a boom assembly indicated generally at 54 which is pivotally mounted for movement about a horizontal axis on a trunk portion 56 which is rotatably mounted on a vertically extending column the bottom portion of which is secured to the platform 50.

The boom assembly 54 is tilted to give a down-up motion of the outer end of the manipulator arm and includes a pair of hollow extendable arm portions 58 which are arranged to be moved in and out of the boom assembly 54 and provide a radial extension or retraction articulation.

Figure 2:
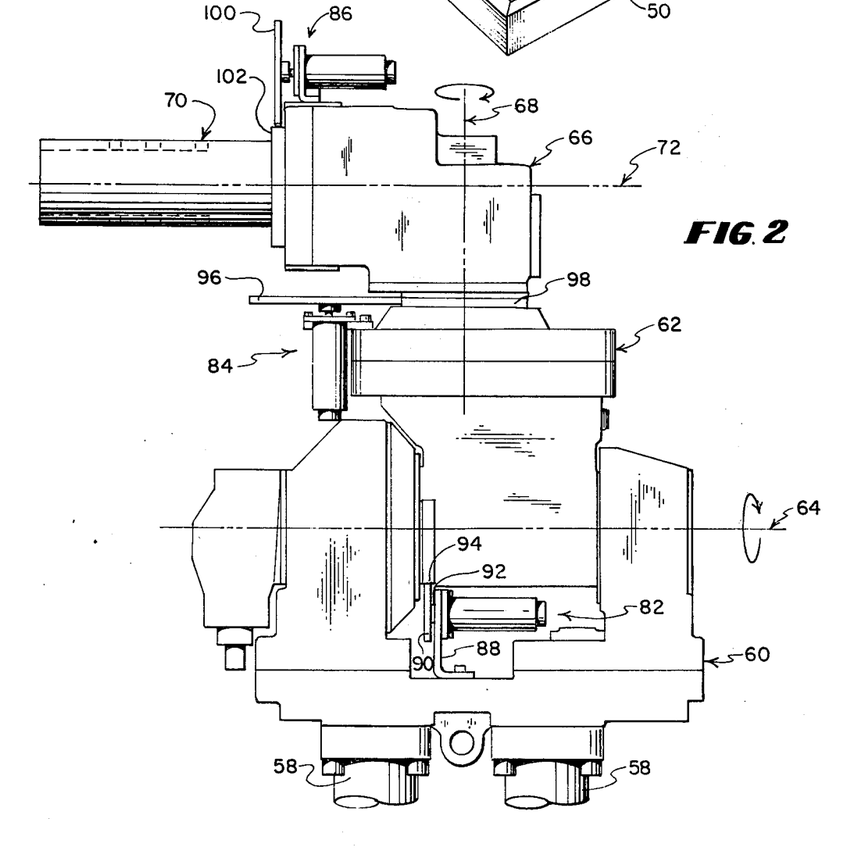
FIG. 2 is an enlarged plan view of the outer three axes and the manipulator hand of the manipulator apparatus as shown in FIG. 1.

The arm portions are secured to a crosshead assembly 60 which carries a projecting hand portion 62. The hand portion 62 is rotatably mounted in the crosshead assembly 60 to be rotated about a wrist bend axis 64 which is in the same general direction as the down-up articulation of the arm. The hand 62 also includes a rotatable extending outer hand portion 66 which is arranged to rotate about a radial axis 68 to produce a wrist swivel movement or articulation of the hand. The outer hand portion 66 is provided with an implement accepting socket 70 which is arranged to be fitted with various manipulator hand implements or welding guns. The implement socket portion 70 extends in a direction perpendicular to the wrist swivel axis 68 and is mounted within the outer hand portion 66 to be rotated about an axis 72 to produce a hand swivel articulation.

The entire boom assembly 54 is arranged to be rotated about the vertical axis of the trunk 56 to produce the sixth articulation or degree of freedom of the manipulator apparatus called the rotary motion.

The various hydraulic and mechanical drive train arrangements to provide the aforementioned movement in the six axes are described in U.S. Pat. No. 3,661,051 to which reference may be made for a detailed description.

The movement in the six axes, referred to as rotary, down-up, in-out, wrist bend, swivel and hand swivel movement, is controlled by comparing the position of the manipulator arm in the six axes with command signals stored in memory and readout in a predetermined sequence representing positional data in a digital format for the six controlled axes. The command signals are recorded in a teach mode in which the manipulator arm is moved to a series of successive positions to which the arm is to be successively moved during a repetitive work or replay cycle.

In order to provide digital information representing the absolute position of the arm and hand assembly in each of the six controlled axes of movement, there is provided a series of six digital encoders, 73, 74, 75, 76, 77 and 78 one for each controlled axis as described in more detail in the above referenced U.S. Pat. No. 3,661,051 and illustrated in FIG. 3. The comparison of the digital position signals from the encoders with the command signals results in an error signal which is utilized to control the drive mechanisms to move the various axes to the desired positions.

Figures 3, 4:
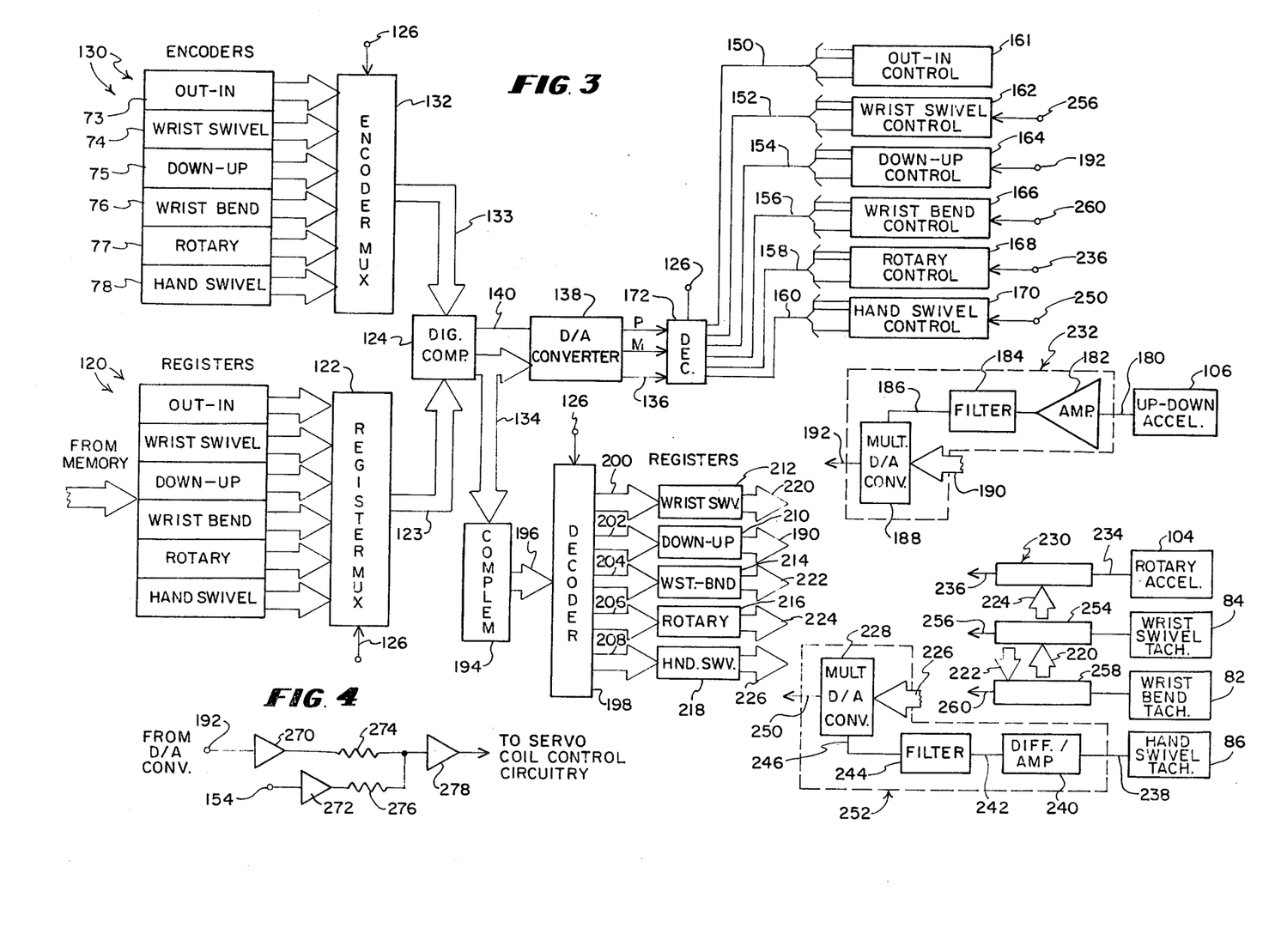
FIG. 3 is a block, schematic and logic diagram of the overall control circuitry of the present invention that is utilized in conjunction with the manipulator apparatus as shown in FIG. 1.
FIG. 4 is a schematic diagram of the distance control circuits as shown in FIG. 3.

In accordance with an important aspect of the present invention and referring to FIGS. 1, 2, and 3, a dynamic sensing assembly 80 is mounted near the outer end of the manipulator boom assembly 54 to sense acceleration in the rotary and down-up axes and tachometer assemblies 82, 84 and 86 are arranged to sense rotation about the wrist bend, wrist swivel and hand swivel axes respectively. The assembly 80 and tachometers 82, 84 and 86 sense the dynamic behavior of the manipulator assembly; the dynamic data being utilized to control the manipulator movement in conjunction with the error signal during replay to improve dynamic performance and stability as will be explained in more detail hereinafter.

The assemblies 80, 82, 84 and 86 provide data representing the dynamic behavior of the outermost end of the arm 54 and hand 62 the point at which the most accuracy is desired. The encoders are capable of accurately measuring the absolute position of the manipulator arm in each of the controlled axes but in some manipulator configurations the encoders do not sense position information at the outer end of the arm. The encoders in these configurations measure the absolute position of certain axes at locations which are removed from the end of the hand 62 where the manipulator arm accomplishes its work.

Thus, the data from encoders 73 through 78 inclusive accurately represents the dynamic behavior of the hand 62 when the mechanical stiffness or rigidity of the interacting axes is nearly ideal and perfectly rigid. However, any practical arm construction has a certain amount of compliance which is accentuated to a considerable degree when a heavy load is being carried by the hand 62. Accordingly, in any practical arm construction the position encoder signals for the various axes will not represent the actual position of the tip of the arm and as the manipulator axes reach their desired points of coincidence in a replay cycle the deceleration as interpreted at the encoders through changing position measurements is not always equal to the deceleration at the tip of the manipulator arm.

In accordance with another important aspect of the present invention, the tachometers 82, 84 and 86 are provided rather than accelerometer devices since the wrist swivel, wrist bend and hand swivel axes are interacting so that sensed acceleration in a particular direction is not definitive of the acceleration in a particular axis which is essential to the control of the apparatus wherein each axis is commanded independently of the other axes. The velocity data sensed by the tachometers 82, 84 and 86 is differentiated to provide independent acceleration data corresponding to these outer three axes with the accleration data being utilized in the control of the manipulator as will be explained in detail hereinafter.

In a specific embodiment, the tachometers 82, 84 and 86 are Servo-tek Model SA-7356F-1 devices which provide low speed and high output signal capabilities. The wrist bend tachometer 82 is carried by a mounting bracket 88 attached to the crosshead assembly 60 and is provided with a rotary contact wheel 90 on the tachometer input shaft 92. The rotary contact wheel 90 is disposed in rotating contact with a circular contact portion 94 of the hand housing 62 to measure the wrist bend of the hand housing 62 about the wrist bend axis 64 relative to the crosshead assembly 60. As the hand 62 rotates about the wrist bend axis 64, the tachometer 82 generates an electrical signal whose voltage is proportional to the instantaneous velocity of the hand assembly 62.

Similarly, the wrist swivel tachometer 84 is carried by the hand 62 and includes a rotary contact wheel 96 disposed in rotary engagement with a circular contact portion 98 of the outer hand portion 66 which rotates with the outer hand. The wrist swivel tachometer 84 measures the velocity of the outer hand portion 66 about the wrist swivel axis 68 relative to the hand 62. Further, the tachometer 86, carried by the outer hand portion 66, includes a rotary contact wheel 100 in rotary engagement with a circular contact portion 102 of the implement socket housing 70 which rotates with socket 70. Thus, the tachometer 86 measures the velocity of the implement socket 70 about the hand swivel axis 72 relative to the outer hand portion 66. The longitudinal axis of each of the tachometers 82, 84 and 86 is parallel to the wrist bend axis 64, the wrist swivel axis 68 and the hand swivel axis 72 respectively.

The accelerometer assembly 80 comprises a three axis array of three linear accelerometers, Model LSB devices manufactured by Schaevitz Engineering in a specific embodiment, or two angular accelerometers, Model ASB devices, manufactured by Schaevitz Engineering in a specific embodiment. If two angular accelerometers are utilized the acceleration may be sensed directly for the rotary and up-down axes: a first accelerometer 104 oriented to sense rotary axis acceleration and a second accelerometer 106 to sense up-down axis acceleration. If three linear accelerometers are utilized which measure the acceleration components in a Cartesian coordinate system (X, Y, Z components), the components in the rotary and up-down directions may be calculated by a coordinate transformation procedure.

Considering now the details of the control system of the manipulator apparatus and referring to FIG. 3 and to the above referenced U.S. Pat. No. 3,661,051, the command signals are sequentially readout of memory into a series of storage registers, one for each of the six controlled axes, referred to generally as 120. The storage registers 120 provide an unambiquous data output of the command signals for the six controlled axes until the memory is advanced to the next step of the program as determined by the manipulator apparatus reaching the position in all six axes as defined by the command signals. It should be understood that the advance of the program may also be determined by the error signal (the difference between the position and command signals) in all six axes being below a predetermined level. The command signal data for each axis is provided to a multiplexer or scanning switch 122 which sequentially provides the command signals on an output data bus 123 for the controlled axes to the digital comparator 124 in a repetitive multiplex scanning cycle under the control of the group scan signal 126. The six encoders, 73 through 78 inclusive and referred to generally as 130, provide the digital absolute position data in each axis as the manipulator moves toward the commanded position for the current step being readout from memory. The digital outputs of the encoders 130 are provided to a multiplexer or scanner switch 132 which sequentially provides the encoder positional signals on an output data bus 133 for the cntrolled axes to the digital comparator 124 in a repetitive multiplex scanning cycle under the control of the group scanning signal 126 so that the positional data from the encoders and the respective command signals are presented for each axis to the comparator 124 during a specific interval of the scanning cycle.

The digital comparator 124 sequentially compares respective positional encoder and command signals for the six controlled axes and provides a digital error signal 134 which is converted to an analog voltage 136 by a digital to analog converter stage 138. The encoder and command signals may be provided in a gray code format whereupon a gray to binary code converter is utilized between each of the multiplexers 122 and 132 and the comparator 124 to provide binary data inputs to the comparator. The comparator 124 also provides a direction signal 140 to the digital to analog converter 138 indicating whether the encoder positional signal for each of the axes is greater or less than the command signal. A decoder scanner stage 172 under the control of the group scan signal 126 provides the analog error voltage 150 through 160 for the six axes to the direction and distance control circuits 161 through 170 inclusive which control movement of the manipulator arm 54 in the controlled axes. The decoder 172 distributes the analog error voltage signal 136 on lines 150 through 160 to the appropriate control circuit along with direction signals, P and M provided by the digital to analog converter 138. The control circuits 161 through 170 are provided with sample and hold capacitors or other suitable sample and hold circuitry so that continuous signals are provided to the servo coils utilized to control the actuators in each axis between the samples which are received one for each axis during each multiplex scan cycle. As the manipulator approaches the commanded position in each of the respective axes, the respective error signals 150 through 160 also decrease. As discussed hereinabove, the program is advanced to the next step when this error signal is zero or below a predetermined level.

For improved control of the manipulator arm, the digital to analog converter 138, as described in more detail in U.S. Pat. No. 3,661,051 referred to previously, is arranged to provide a varying analog error voltage representative of the distance to be moved in each axis in conjunction with the characteristics of the servo coils and associated valves in each control circuit. The servo coils and valves are characterized by a current-flow relationship wherein an increased analog error voltage to the control circuits 161 through 170 results in increased current flow through the servo coil and an increased flow through the controlled valve. The increased flow results in an increased velocity of the controlled axis in which the valve is controlled. As the analog error signal 136 decreases and at a predetermined value of the digital error signal indicating that the manipulator is moving toward the commanded point, the analog voltage 136 begins to decrease from its maximum level. Thus, the velocity of the respective manipulator axis decreases with corresponding deceleration. The servo valve characteristic is arranged to have a square-law relationship such that for small values of current, i.e., when the analog error signal is small, the valve will be relatively insensitive. The characteristic of the converter 138, the relationship of the digital error signal in to analog signal out, is arranged to provide a desired predetermined overall deceleration characteristic of the manipulator apparatus as explained in more detail in and illustrated in FIG. 18 of the above referenced patent. When the manipulator arm reaches the commanded point as defined by the coincidence of the command signals and the encoder positional signals to within a desired accuracy, the manipulator arm stops so that there is zero velocity in each of the six controlled axes. The control circuitry is also arranged to advance the memory to readout the next sequential command step in the program at that time or subsequent to accomplishing a programmed manipulation or weld at the commanded point. An ideal deceleration characteristic wherein the velocity abruptly changes from a maximum to zero as the position error approaches zero is not possible in a practical manipulator moving at relatively high tip velocities and including appreciable arm mass and mass in the load carried by the arm. As illustrated in FIG. 18 of the above-referenced patent, the optimized realizable deceleration curve is parabolic.

In accordance with an important feature of the invention, the accelerometers 104 and 106 and the tachometers 82, 84 and 86 provide dynamic feedback of the actual behavior of the tip of the manipulator arm and of the manipulator hand 62 which is utilized to improve stability and dynamic performance of the manipulator apparatus. The dynamic feedback data is selectively combined with the positional error signal in a predetermined manner by providing a high level negative feedback signal for a particular axis during deceleration in that axis and a low level signal during acceleration. The stabilization of the positional servo loop with dynamic feedback allows a faster deceleration characteristic to be achieved as well as to reduce whipping and perturbations of the arm as it comes to rest.

The analog acceleration signal 180 generated by the up-down accelerometer 106 is amplified by stage 182 and provided to a filter stage 184 having a band-pass of approximately 1.5 to 500 Hz. The filtered acceleration signal 186 is provided to a multiplying digital to analog converter 188 as the variable reference input. The digital input 190 to the digital to analog converter 188 is derived from the digital error signal 134 for the up-down axis according to a predetermined relationship. In a specific embodiment, the digital signal 190 is the complement of the digital error signal 134 so that the dynamic analog control signal output 192 of converter 188 increases as the digital error signal decreases to avoid conflict between the positional error signal and the dynamic feedback signal and is also directly related to the instantaneous acceleration in the up-down axis. Specifically, the multiplexed digital error signal 134 is provided to a logic stage 194 which provides the complement of the binary number represented by error signal 134 at the output 196. The multiplexed complemented digital output 196 is presented to a decoder stage 198 which sequentially distributes the complemented digital error signal for each axis, except the in-out axis, on outputs 200 through 208 respectively. It is not contemplated to provide the dynamic feedback to the in-out axis in the preferred embodiment since the dynamic characteristics of the in-out axis are normally suitable without further dynamic feedback control although it should be understood that dynamic control of all the commanded manipulator axes is contemplated in alternate embodiments. The decoder 198 is also controlled by the group scan signal 126.

The complemented output 202 for the up-down axis is provided to a register 210 which stores the signal for the present scan cycle. The register 210 is strobed during each scan cycle to provide an unambiquous digital signal 190 to the digital to analog converter 188 throughout the time duration between successive scan signals. Similarly the complemented outputs 200, 204, 206 and 208 are each provided to a respective register stage 212, 214, 216 and 218 to provide respective digital inputs 220, 222, 224 and 226 to a respective multiplying digital to analog converter stage for each axis such as a converter stage 228 for the hand swivel axis having digital input 226. The rotary axis accelerometer utilizes an amplifier, filter stage, and converter combination referred to generally as 230 identical to the combination referred to generally as 232 of an amplifier, a filter stage and a converter stage for the up-down axis. The stage 230 is connected to utilize the output 234 of the rotary accelerometer 104 to provide a dynamic analog control signal 236.

The output 238 of the tachometer 86 for the hand swivel axis is provided to a differentiator-amplifier stage 240 to provide an output 242 representing the instantaneous acceleration in the hand swivel axis comparable to the signal 180 and the output of amplifier 182 in the up-down axis. The acceleration signal output 242 is provided to a filter stage 244 similar to stage 184 and the output of the filter 244 is connected to the multiplying reference input 246 of a miltiplying digital to the analog converter stage 228 similar to stage 188 to provide the dynamic analog control signal 250 for the hand swivel axis.

The combination of hand swivel axis stages 240, 244 and 228, referred to generally as 252, is duplicated for the wrist bend and wrist swivel axes with stage 254 connected to the output of wrist swivel tachometer 84 and utilizing digital input 220 to provide a dynamic control signal output 256. The output of the wrist bend tachometer 82 is connected to stage 258 similar to stage 252 having a differentiator-amplifier, a filter, and a digital to analog converter having digital signal 222 as an input to provide a dynamic analog control voltage 260.

The dynamic control output signals 256, 192, 260, 236 and 250 for the wrist swivel, down-up, wrist bend, rotary and hand swivel axes respectively are provided to the direction and distance control circuits 162, 164, 168 and 170 respectively where they are combined with the respective analog control voltages 152, 154, 156, 158 and 169 to control the respective servo coils and provide improved dynamic performance. The controls signals 256, 192, 260, 236 and 250 provide dynamic feedback information from the outermost portions of the manipulator apparatus to stabilize and improve the deceleration characteristics by selectively combining an increasing dynamic feedback signal in a negative feedback sense as the position error decreases and as the deceleration increases.

Thus a high feedback signal is provided during deceleration and a low signal is provided during the acceleration phase to ensure that the position and dynamic signals are not in conflict with each other. To this end, the complementing stage 194 in other specific embodiments may comprise various digital transformation characteristics to achieve various magnitudes of acceleration feedback for different ranges of positional errors. The function applied to the digital inputs 190, 220, 222, 224 and 226 may comprise a step function having multiple levels or steps as determined by the ladder network and function generator utilized in the digital to analog converter 138 on conductors S1–S11 as explained in more detail in U.S. Pat. No. 3,661,051 referred to hereinabove.

In any event, as the various axes of the arm experience high deceleration factors such as caused by the bending or whipping of the arm, this factor will be sensed by the accelerometers 104 and 106 and the tachometers 82, 84 and 86 and applied as a feedback signal to the respective direction and distance control circuit. The respective servo valves will be controlled to reduce the flow below that as determined by the positional error signal alone to prevent the arm from overshooting the command point and to reduce perturbations when the commanded point is nearly reached.

The direction and distance control circuits 162 through 170 in a specific embodiment, referring to FIG. 4, comprise an inverting amplifier 270 which has the dynamic analog control voltage 192 as an input for example, for the direction and distance control circuit 164 in the down-up axis. The servo amplifier 690 and the associated circuitry as shown in FIG. 11 of the above referenced U.S. Pat. No. 3,661,051 is indicated generally in FIG. 4 as amplifier stage 272 which has the analog positional error signal 154 as an input. The inputs of the amplifier stages 270 and 272, of opposite polarity, are combined by commonly connected resistors 274 and 276. Resistor 274 is connected to the output of amplifier 270 and resistor 276 is connected to the output of amplifier 272. The junction of resistors 274 and 276 representing the combined positional and dynamic control signals is connected to an amplifier stage 278 which drives the servo coil control circuitry and specifically the base electrodes of the control transistors 702 and 704 in FIG. 11 of the above-referenced patent.

In order to compensate for the effect of gravity on the manipulator arm in the down-up axis, an offset voltage equivalent to the magnitude of one "g" of acceleration is subtracted from the output 192 of the converter stage 188. To this end, an offset voltage is connected to a second input of amplifier 270 which may be an operational amplifier wherein the input 192 is connected to the inverting input and the offset compensation voltage is connected to the non-inverting input. The output of amplifier 270 will then represent the net acceleration of the manipulator arm in the down-up axis compensated for the effects of gravity.

It should be understood, however, that many specific circuit configurations may be utilized to combine the dynamic feedback control signal and the positional control signal 154 to control the servo control circuitry of the drive actuators for the axes. The servo control circuit may also comprise a servo coil connected between ground potential or a reference voltage and a bipolar control amplifier driven by a combined bipolar signal of the two feedback signals wherein the P and M direction signals are utilized to determine the polarity of the combined signal. The sense or polarity of the dynamic feedback signal such as 192 is always opposite to that of the positional control signal such as 154.

Considering the specific parameters of one embodiment of the dynamic feedback stages such as stage 232 comprising the filter stage 184, the amplifier 182 and the digital to analog converter 188, the following parameters have been found suitable although they should not be interpreted in a limiting sense: the accelerometer 106 may have a nominal output or sensitivity of 15 mv per "g" of acceleration force and the amplifier stage 182 may have a gain of approximately 75. Considering the tachometers 80 and 82, a sensitivity of 7mv/rpm is suitable to drive the differentiator-amplifier stage 240 which may have a gain of approximately 75.

While there has been illustrated and described a single embodiment of the present invention, it will be apparent that various changes modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmable manipulator, the combination of, a manipulator arm, means for moving said arm to different positions in a plurality of independent axes, memory storage means for storing digital representations corresponding to different positions of said arm in said axes, encoder means for each of said axes and operative to develop position signals corresponding to the actual position of said arm in said plurality of axes, comparing means for comparing command and position signals and developing an error signal related to the difference therebetween, means for sensing the acceleration in at least one of said independent axes at a location on said manipulator arm closer to the outer end of said manipulator arm than the location at which the encoder for said axis measures positional data and for generating a dynamic feedback signal related to the acceleration in said axis, and means for combining said error signal and said dynamic feedback signal to control said moving means.

2. The combination of claim 1 wherein said sensing and generating means includes accelerometer means for providing an acceleration signal and means responsive to said acceleration signal and said error signal for producing said dynamic feedback signal, said dynamic feedback signal increasing in magnitude with an increase in said acceleration signal and increasing in magnitude with a decrease in said error signal.

3. The combination of claim 1 wherein said dynamic feedback signal is proportional to the acceleration in said axis.

4. The combination of claim 2 wherein said acceleration signal is proportional to the acceleration in said axis.

5. The combination of claim 1 wherein said dynamic feedback signal is inversely proportional to said error signal.

6. In a programmable manipulator, the combination of, a manipulator arm, means for moving said arm to different positions in a plurality of independent axes, memory storage means for storing digital representations corresponding to different positions of said arm in said axes, encoder means for each of said axes and operative to develop position signals corresponding to the actual position of said arm in said plurality of axes, comparing means for comparing command and position signals and developing an error signal related to the difference therebetween, means for sensing the velocity in at least one of said independent axes at a location on said manipulator arm than the location at which the encoder for said axis is positioned and for generating a dynamic feedback signal related to the acceleration in said axis, and means controlling said moving means for combining said error signal and said dynamic feedback signal.

7. In a programmable manipulator, the combination of, a manipulator arm, means for moving said arm to different positions in a plurality of independent axes, memory storage means for storing digital representations corresponding to different positions of said arm in said axes, encoder means for each of said axes and operative to develop position signals corresponding to the actual position of said arm in said plurality of axes, comparing means for comparing command and position signals and developing an error signal related to the difference therebetween, means for sensing the dynamic behavior of at least one axis of said independent axes at a location on said manipulator arm physically closer to the outer end of said manipulator arm than the location at which the encoder for said axis is positioned, and means responsive to said dynamic sensing means and said error signal for controlling said moving means.

8. In a programmable manipulator, the combination of, a manipulator arm, means for moving said arm to different positions in a plurality of independent axes, memory storage means for storing digital representations corresponding to different positions of said arm in said axes, encoder means for each of said axes and operative to develop position signals corresponding to the actual position of said arm in said plurality of axes, comparing means for comparing command and position signals and developing an error signal related to the difference therebetween, means for sensing the acceleration in at least one of said independent axes at a location on said manipulator arm closer to the outer end of said manipulator arm than the location at which the encoder for said axis measures positional data;

function generator means responsive to said error signal; and multiplying digital to analog converter means having the output of said acceleration sensing means as a variable reference input and the output of said function generator means as a digital input, the analog output of said multiplying digital to analog converter providing a dynamic feedback signal which increases in magnitude with an increase in the output of said acceleration sensing means and increases with a decrease in said error signal.

9. The combination of claim 8 wherein said function generator means performs a binary complementary function.

10. The combination of claim 8 wherein a bandpass filter stage is provided between said accelerometer means and said dynamic feedback signal generating means.

11. In a programmable manipulator, the combination of, a manipulator arm, means for moving said arm to different positions in a plurality of independent axes, memory storage means for storing digital representations corresponding to different positions of said arm in said axes, encoder means for each of said axes and operative to develop position signals corresponding to the actual position of said arm in said plurality of axes, comparing means for comparing command and position signals and developing an error signal related to the difference therebetween, tachometer means for sensing the velocity in at least one of said independent axes at a location on said manipulator arm physically closer to the outer end of said manipulator arm than the location at which the encoder for said axis is positioned and providing an electrical velocity signal;

means for differentiating said velocity signal to provide an acceleration signal proportional to the acceleration in said one axis;

means for combining said acceleration signal and said error signal to provide a dynamic feedback signal which increases in magnitude with a decrease in said error signal and also increases in magnitude with an increase in said acceleration signal; and means for controlling said moving means in accordance with said dynamic feedback signal.

12. The combination of claim 11 wherein said dynamic feedback signal producing means includes function generator means responsive to said error signal and multiplying digital to analog converter means having a variable reference input responsive to said differetiator means and the output of said function generator means as a digital input, said converted analog output of said multiplying digital to analog converter providing said dynamic feedback signal.

13. The combination of claim 12 wherein said function generator means perform a binary complementary function.

14. The combination of claim 12 wherein a bandpass filter stage is provided between said differentiator means and said multiplying digital to analog converter means.

15. The combination of claim 11 wherein said velocity signal is proportional to the velocity in said axis.

16. The combination of claim 11 wherein said dynamic feedback signal is proportional to the acceleration in said axis.

17. The combination of claim 11 wherein said dynamic feedback signal is inversely proportional to said error signal.

18. A control circuit for use with an apparatus which utilizes indirect position sensing to control the operation of said apparatus at a location physically remote from the point of position sensing, said control circuit comprising:

means for developing an indirect position sensing signal;

means including accelerometer means for sensing the dynamic behaviour of said apparatus at said remote location and providing an acceleration signal;

means for generating a dynamic feedback signal related to the dynamic behaviour at said remote location and including function generator means responsive to said indirect position sensing signal and multiplying digital to analog converter means;

said multiplying digital to analog converter means having said acceleration signal as a variable reference input and the output of said function generator means as a digital input and providing said dynamic feedback signal at the analog output thereof; and means for combining said dynamic feedback signal and said indirect position sensing signal to control the operation of said apparatus.

19. The combination of claim 18 wherein said sensing means includes tachometer means, said generating means includes differentiator means for providing an acceleration signal and said dynamic feedback signal means includes function generator means responsive to said indirect position sensing signal and multiplying digital to analog converter means having said acceleration signal as a variable reference input and the output of said function generator means as a digital input, said multiplying digital to analog converter means providing said dynamic feedback signal.

20. In a programmable manipulator, the combination of a manipulator arm, means for moving said arm in a plurality of independent axes, means for developing a series of command signals representing different positions of said arm in said axes, encoder means for measuring the actual position of said arm in said plurality of axes and developing position signals corresponding thereto, comparing means for comparing command and position signals and developing an error signal related to the difference therebetween, means for developing an acceleration signal proportional to the rate of change of velocity in one of said axes, means for modifying said acceleration signal in accordance with the value of said error signal in said one axis, and means for combining said error signal and said modified acceleration signal to control said moving means in said one axis.

21. The combination of claim 20, wherein said acceleration signal is varied inversely with respect to said error signal to provide said modified acceleration signal.

22. The combination of claim 20, which includes acceleration sensing means mounted on said arm to measure the acceleration in said one axis closer to the outer end thereof than measurement of the position of said arm in said one axis by said encoder means.

23. The combination of claim 22, wherein said acceleration sensing means includes means for developing a signal proportional to the velocity of said arm in said one axis, and means for differentiating said velocity signal to provide said acceleration signal.

24. The combination of claim 20, which includes a manipulator hand connected to the outer end of said arm and movable in a plurality of axes with respect to said outer end of said arm, said plurality of axes including said one axis for which said acceleration signal is developed.

25. The combination of claim 24, wherein said encoder means for said one axis is mounted on said arm remote from said free end thereof and said acceleration sensing means includes means for developing a velocity signal proportional to the velocity of movement of said hand in said one axis, and means for differentiating said velocity signal to provide said acceleration signal.

26. The combination of claim 25, wherein said manipulator hand includes first and second parts movable with respect to each other, and said velocity signal developing means includes a tachometer mounted on one of said parts for measuring the velocity of the other part.

* * * * *

UNITED STATES PATENT OFFICE
CERTIFICATE OF CORRECTION

Patent No. 4,132,937  Dated January 2, 1979

Inventor(s) Joseph F. Engelberger et al

It is certified that error appears in the above-identified patent and that said Letters Patent are hereby corrected as shown below:

Column 10, line 63, after "arm" insert --physically closer to the outer end of said manipulator arm--.

Signed and Sealed this

Tenth Day of April 1979

[SEAL]

Attest:

RUTH C. MASON
Attesting Officer

DONALD W. BANNER
Commissioner of Patents and Trademarks